UNITED STATES PATENT OFFICE.

ANDREW J. ADAMSON, OF SABETHA, KANSAS.

PROCESS OF MAKING SIRUP AND SUGAR FROM SORGHUM-CANE.

SPECIFICATION forming part of Letters Patent No. 291,565, dated January 8, 1884.

Application filed January 2, 1883. (No specimens.)

*To all whom it may concern:*

Be it known that I, ANDREW J. ADAMSON, of Sabetha, in the county of Nemaha and State of Kansas, have invented a new and useful Improvement in Process of Making Sirup and Sugar from Sorghum-Cane, of which the following is a full, clear, and exact description.

My invention relates to the manufacture of sirup and sugar from sorghum-cane; and the invention consists in the novel process of treating the cane before the juice is expressed.

Attempts heretofore to manufacture a first-class sirup or sugar from sorghum-cane have been more or less unsuccessful, partly, no doubt, owing to the fact that sorghum-juice contains a large percentage of impurities, including green vegetable matter, which cannot easily be eliminated in the process of converting into sirup or sugar. I therefore provide for the separation of the pure juice and impurities before the former is expressed from the cane, and my process consists in first roasting the cane until it throws out a gummy substance, which sticks to the stalks. The cane, while warm, is then run through a mill, and the juice thus expressed is filtered through white clay to remove any particles of earth or woody fiber it may contain. The pure juice thus obtained is then boiled down in the usual manner, which requires, however, only about half the time required when the cane is not roasted.

The sirup thus produced is much purer than that made by the usual method, and will not sour so readily. It is also devoid of the peculiar rank taste of ordinary sorghum-sirup. The sirup is converted into sugar in the usual manner.

What I claim is—

1. The process of manufacturing sirup and sugar from sorghum-cane, which consists in first roasting the cane, and then expressing the juice and filtering and boiling the same, substantially as herein specified.

2. The process of separating native impurities from sorghum-juice, which consists in first roasting the cane and then expressing the juice, substantially as herein specified.

ANDREW J. ADAMSON.

Witnesses:
J. A. McCAUL,
E. HOLTZSTONE.